United States Patent
Dai et al.

(10) Patent No.: US 10,853,374 B2
(45) Date of Patent: Dec. 1, 2020

(54) USING USER FEEDBACK TO RANK SEARCH RESULTS

(71) Applicant: MICROSOFT TECHNOLOGY LICENSING, LLC, Redmond, WA (US)

(72) Inventors: James Dai, Redmond, WA (US); Julia H. Farago, Seattle, WA (US); Natala J. Menezes, Seattle, WA (US); Ramez Naam, Seattle, WA (US); Saleel Sathe, Redmond, WA (US); Hugh E. Williams, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/489,040

(22) Filed: Sep. 17, 2014

(65) Prior Publication Data

US 2015/0006522 A1   Jan. 1, 2015

Related U.S. Application Data

(63) Continuation of application No. 11/342,606, filed on Jan. 31, 2006, now Pat. No. 8,874,591.

(51) Int. Cl.
*G06F 16/00* (2019.01)
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC ........... G06F 17/30; G06F 17/00; G06F 16/00
See application file for complete search history.

(56) References Cited

U.S. PATENT DOCUMENTS

| | | | | |
|---|---|---|---|---|
| 5,862,325 | A | * | 1/1999 | Reed ........................ H04L 29/06 704/270.1 |
| 6,088,692 | A | * | 7/2000 | Driscoll .............. G06F 16/3346 |

(Continued)

FOREIGN PATENT DOCUMENTS

| | | |
|---|---|---|
| EP | 1050830 A2 | 11/2000 |
| WO | 2005091175 A1 | 9/2005 |

OTHER PUBLICATIONS

Dmitriev, Pavel A., Nadav Eiron, Marcus Fontoura, and Eugene Shekita. "Using annotations in enterprise search." In Proceedings of the 15th international conference on World Wide Web, pp. 811-817. ACM, 2006.*

(Continued)

*Primary Examiner* — Farhan M Syed
(74) *Attorney, Agent, or Firm* — Shook, Hardy and Bacon, L.L.P.

(57) ABSTRACT

A method and media are provided for managing feedback data that will be used for ranking search results. A plurality of user feedback data from more than one user can be aggregated into a search index. The user feedback data can be associated with one or more documents within the index such that the one or more documents can be ranked based on the type of feedback data that is aggregated. Once the documents have been ranked, the ranked documents can be provided to a requester.

20 Claims, 3 Drawing Sheets

(56) References Cited

U.S. PATENT DOCUMENTS

| | | | | |
|---|---|---|---|---|
| 6,088,717 | A * | 7/2000 | Reed | H04L 29/06 707/999.01 |
| 6,345,288 | B1 * | 2/2002 | Reed | H04L 63/045 707/999.001 |
| 6,397,212 | B1 * | 5/2002 | Biffar | G06Q 30/0201 707/704 |
| 6,434,550 | B1 * | 8/2002 | Warner | G06F 16/30 |
| 6,938,034 | B1 * | 8/2005 | Kraft | G06F 17/2211 |
| 7,062,561 | B1 * | 6/2006 | Reisman | G06F 16/00 709/227 |
| 7,461,155 | B2 * | 12/2008 | Reisman | G06F 16/00 709/227 |
| 7,698,301 | B2 * | 4/2010 | Lourdeaux | G06F 16/22 707/999.107 |
| 7,774,350 | B2 * | 8/2010 | Widjojo | G06Q 40/04 707/752 |
| 8,255,541 | B2 * | 8/2012 | Reisman | G06F 16/00 709/227 |
| 8,682,911 | B2 * | 3/2014 | Widjojo | G06Q 10/0639 707/752 |
| 2002/0069190 | A1 * | 6/2002 | Geiselhart | G06F 16/3326 |
| 2002/0120609 | A1 * | 8/2002 | Lang | G06F 16/337 |
| 2003/0033299 | A1 | 2/2003 | Sundaresan | |
| 2003/0046098 | A1 * | 3/2003 | Kim | G06F 16/951 705/1.1 |
| 2003/0172075 | A1 * | 9/2003 | Reisman | G06F 16/951 |
| 2004/0083127 | A1 * | 4/2004 | Lunsford | G06Q 10/063 705/7.32 |
| 2004/0225715 | A1 * | 11/2004 | Gottfried | G06Q 30/02 709/204 |
| 2005/0027670 | A1 * | 2/2005 | Petropoulos | G06F 17/30867 |
| 2005/0192958 | A1 * | 9/2005 | Widjojo | G06Q 30/0203 |
| 2005/0210042 | A1 * | 9/2005 | Goedken | G06F 16/338 |
| 2006/0167862 | A1 * | 7/2006 | Reisman | G06F 16/00 |
| 2006/0278064 | A1 * | 12/2006 | Lourdeaux | H04L 67/22 84/609 |
| 2007/0106659 | A1 * | 5/2007 | Lu | G06F 16/3326 |
| 2007/0130145 | A1 * | 6/2007 | Pedersen | G06F 17/30011 |
| 2009/0119286 | A1 * | 5/2009 | Reisman | G06F 16/3331 |
| 2010/0325014 | A1 * | 12/2010 | Widjojo | G06Q 30/0203 705/26.35 |
| 2014/0067606 | A1 * | 3/2014 | Widjojo | G06Q 40/04 705/26.35 |

OTHER PUBLICATIONS

"First Office Action Issued in India Patent Application No. 03335/CHENP/2008", dated Jan. 30, 2015, 3 Pages.

Beg, Sufyan M.M, "User Feedback Based Enhancement in Web Search Quality", In Journal of Information Sciences—Informatics and Computer Science, vol. 170, Issue 2-4, Feb. 25, 2005, 20 Pages.

* cited by examiner

USING USER FEEDBACK TO RANK SEARCH RESULTS

CROSS-REFERENCE TO RELATED APPLICATIONS

This application is a continuation of U.S. application Ser. No. 11/342,606, filed Jan. 31, 2006, entitled "Using User Feedback To Improve Search Results," which is incorporated by reference herein in its entirety.

STATEMENT REGARDING FEDERALLY SPONSORED RESEARCH OR DEVELOPMENT

Not applicable.

BACKGROUND OF THE INVENTION

Products and services evolve and improve over time through the comments, suggestions, and feedback of the general public. The general public can be a good source of feedback as it is the public that uses these products and services on a regular basis, and the public may be able to observe most flaws within the product or service that may need to be corrected.

There are many searching services available to the public that can search for a wide-range of information for a requesting user. Many of these searching services are based on different algorithms that are used to find the most relevant search results for a user's search request. However, these algorithms are not always perfect and may not always provide the best search results for a user's search request. Additionally, a search result set for a particular search query may be adequate for one person, however, the same search result for the same search query may not be sufficient for another person because everyone's needs and likes are not the same. Searching services, therefore, could be another service that could benefit from being subjected to user comments and feedback. Incorporating user feedback into the searching services' method of providing search results could lead to better and more relevant search results as the public's own feedback can be used to offer a better sense of what the public wants instead of just relying on algorithms to provide results.

BRIEF SUMMARY OF THE INVENTION

A system and method for managing feedback data to be used for ranking search results is presented. The system and method discloses aggregating elements of feedback data from a plurality of users, wherein the feedback data can be in an unstructured or structured format. Moreover, the system and method discloses associating the feedback data with one or more documents. Additionally, the system and method can rank the one or more documents based from the feedback data. Furthermore, the system and method can provide the ranked one or more documents as search results to a search request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF THE INVENTION

Figure 1:
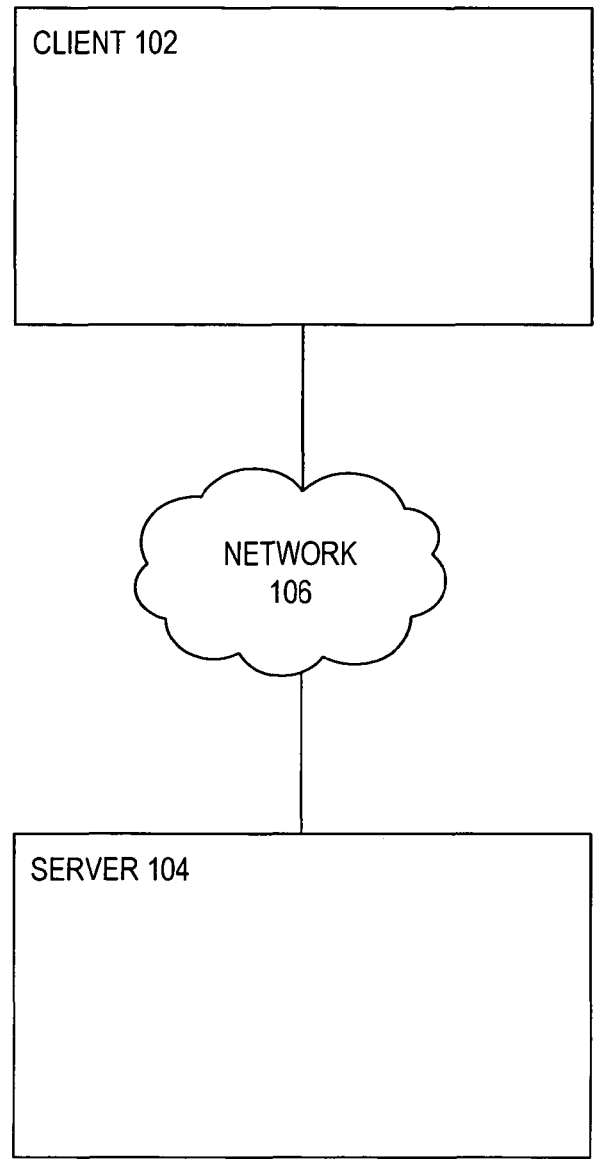
FIG. 1 illustrates an embodiment of a system for implementing the invention.

FIG. 1 illustrates an embodiment of system for implementing the invention. Client 102 can be a desktop or laptop computer, a network-enabled cellular telephone (with or without media capturing/playback capabilities), wireless email client, or other client, machine, device, or combination thereof, to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device.

Server 104 may be or can include a workstation running the Microsoft Windows®, MacOS™, Unix, Linux, Xenix, IBM AIX™, Hewlett-Packard UX™ Novell Netware™, Sun Microsystems Solaris™, OS/2™, BeOS™, Mach, Apache, OpenStep™ or other operating system or platform. In an embodiment, client 102 may also be a server.

Client 102 can include a communication interface. The communication interface can be an interface that allows the client to be directly connected to any other client or device or that allows the client 102 to be connected to a client, server, or device over network 106. Network 108 can include, for example, a local area network (LAN), a wide area network (WAN), or the Internet. In an embodiment, the client 102 can be connected to another client, server, or device via a wireless interface.

Figure 2:
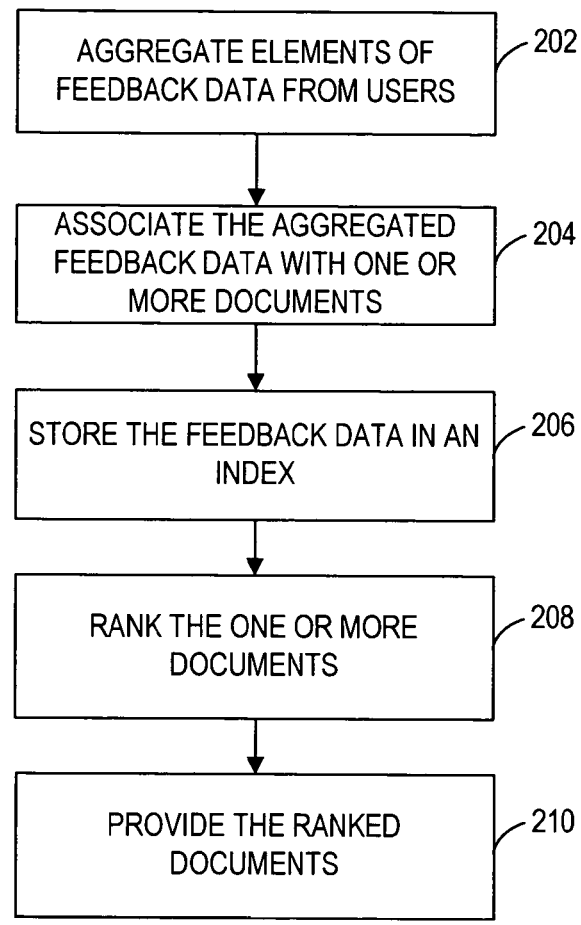
FIG. 2 illustrates an embodiment of a method for managing feedback data that can be used for ranking search results.

FIG. 2 illustrates an embodiment of a method for managing feedback data that can be used for ranking search results. In an embodiment, a search engine can be used as a server that can manage such feedback data. The search engine can include an index that can be, for example, an inverted index. In step 202, a search engine can aggregate one or more elements of feedback data from one or more users. The feedback data can be any type of information received from a user that is associated with a document. In an embodiment, the feedback data can be used to rate a document according to the relevance of a corresponding search query, wherein the search query can comprise at least one search term. In another embodiment, the feedback data can generally describe the user's feelings about a particular document. In such embodiments, the feedback data can describe how pleased or how dissatisfied the user is with the document. A document can be, for example, a web page, any type of multimedia content, or any other type of content that can be indexed by a search engine. In an embodiment, a document can be presented to the user as a search result.

In step 204, the aggregated feedback data can be associated with one or more documents. In an embodiment, the user can transmit feedback data to the search engine in a structured format. In creating a structured format, the search engine can present an user interface (UI) to the user in which the search engine can define what type of information it would like to have from the user. For example, the search engine can create a UI in which it can request that the user provide feedback data regarding a particular document by rating the document on a scale of 1-5 wherein 5 could be the most favorable rating for the document and 1 could be the least favorable rating. Another example could be presenting a UI to the user in which the user can select from any number of buttons that correspond to predefined textual descriptions of a document. The textual description can describe how pleased or how dissatisfied the user is with the document. For example, the UI may contain such terms as "the best possible," "good," "fair," "poor," or "the worst possible" that the user can select as feedback data regarding a particular document. In yet another example, the search engine can present an UI to the user and ask the user provide feedback data by reordering documents within a search result to show which documents the user believes are more relevant to their search request than other documents. The invention can use a client-side scripting language that can offer a conventional means to allow the user to reorder the documents. For example, the user could click and drag icons, images, or links that represent documents above or below other icons, images, or links of other documents to create a reordered list of documents that correlate to an ascending or descending order of relevance.

In any type of structured format for receiving feedback data in a pre-defined manner, the search engine can associate the feedback data with the particular document because the search already has knowledge of what type of information it will receive from the user. Additionally, if the feedback data was in response to a document included in a list of search results provided by the search engine, the search engine can associate the search query that corresponds to the search results, the feedback data, and document together with each other.

In another embodiment, the user can transmit feedback data to the search engine in an unstructured format. In creating an unstructured format for the user to transmit feedback data, the search engine can present an UI to the user in which the user can freely enter in any type of information that can reveal the user's feelings regarding a particular document. For example, the search engine can present a UI including a text box in which the user can type in whatever comments he/she has as feedback data concerning a particular document.

In an embodiment, the feedback data can be directly correlated to a search query as the feedback data is provided in response to search results received from a search engine that the search engine provided after receiving the search query. For example, the feedback data can be linked to a searching experience wherein the user can provide feedback data that can be associated with a web page that the search engine provided as a search result to the user's search query. Since the feedback data is linked to a search query that the search engine provided search results for, the search engine can associate the feedback data with the particular document and the search query.

In another embodiment, the feedback data may not be directly correlated with a search query and the search engine may not be able to directly link the feedback data with a document or a search query. In fact, a user may be able to provide feedback data that is not directly related to a search experience. More specifically, a user may be able to provide feedback data by contacting the search engine, a separate server that is connected to the search engine, or by contacting the entity that is managing the search engine. For example, the user can send an email as feedback data to the search engine or separate server that can describe their feelings about a particular search result that it received while conducting a search request, or the feedback data can generally describe the user's feelings about a particular document. In another example, the user can call the entity that is managing the search engine and can verbally provide feedback data that can describe their feelings about a particular search result that it received while conducting a search request, or again the feedback data can generally describe the user's feelings about a particular document. The entity can then convert the speech into text using conventional speech-to-text software. In yet another example, the search engine or separate server can retrieve feedback data that may be found on a blog on the Internet. In each example, the search engine or separate server can parse the text using conventional parsing algorithms to associate the feedback data to a particular document and possibly a search query as well.

In step 206, the search engine can store the aggregated feedback data in its index. Again, the index can be, for example, an inverted index. In an embodiment, the feedback data, one or more documents, and search query that were associated together in step 204 can be stored together in the index. In another embodiment, the feedback data can be stored in a separate index from other content that is indexed by the search engine from the network.

In step 208, the search engine can rank one or more documents stored in its index based from the feedback data that it received. The feedback data can be one feature of a plurality of features that can be used to provide better search results for similar search queries that were associated with the feedback data. For example, the text indexed from documents found on the Internet can be one feature to determine the ranking of search results for particular search queries. Another feature can be the text received from the user feedback data. Yet another feature can be the text found specifically from the title of a document. Moreover, another feature can be the ratio of the size of a document to the number of times a particular word is found within the document. It should be noted that any type of feature can be used to determine how to rank one or more documents. The above-mentioned features are only a subset of the types of features that can be used to determine how to rank certain documents, therefore, the invention should not be limited to only those examples.

When ranking a plurality of documents for a particular search query, the search engine can be configured to emphasize the importance of a word found within the feedback data more than the word being found within the context of any other feature. For example, the search engine can emphasize the feedback data that contains a particular word as being three times more important than a document that contains that same word ten times within itself. In helping itself determine the importance of a word relative to what feature it is found in, the search engine can attach different identifiers with particular words of search queries that can inform the search engine as to where the word came from after it is indexed in the search engine. For example, the search engine may use an identifier to signal that the word came from a title of a document, an identifier to show that the word came from the body of the document, or another identifier to show that it came from feedback data.

In other embodiments, search results, including documents, can be ranked based on a comparison of the context of a word within a particular feature. For example, the a word that is found toward the top of a particular item of feedback data can have more importance than the number of times the word in found within the same element of feedback data. The same example can be applied to a document, wherein the number of times a word is found within the document can have more importance than where the word is found within the document. The way in which the search engine is configured to emphasize certain features can determine how the search engine will subsequently rank and provide search results for similar search queries in view of the received feedback data. Once the one or more documents have been ranked, in step 210, the search engine can provide the ranked documents for similar search queries that correspond to the search queries that have already been associated with particular feedback data.

The feedback data that is stored in the search engine's index may have a life span or a staleness rate. For example, in an embodiment, the invention can be configured to emphasize older feedback data less than feedback data that was received at a time closer to when a search request was received from a user. In another embodiment, the staleness rate of the feedback data can vary according to the crawl rate of the document that the feedback data corresponds to. For example, if a document, a web page for example, has a high crawl rate, meaning the data found on the web page is indexed by the search engine frequently (every hour for example), then feedback data that is associated with that web page can become stale and unimportant at the same rate as the web page is indexed. The staleness of the feedback data can then become another feature for determining how to rank one or more documents in view of the feedback data. However, in another embodiment, a document that has a high crawl rate can be deemed to be more important than other documents with lower crawl rates. In such an embodiment, any type of feedback data received that is associated with a document with a high crawl rate can also be deemed important and can become another feature for determining how to rank one or more documents in view of the feedback data.

Figure 3:
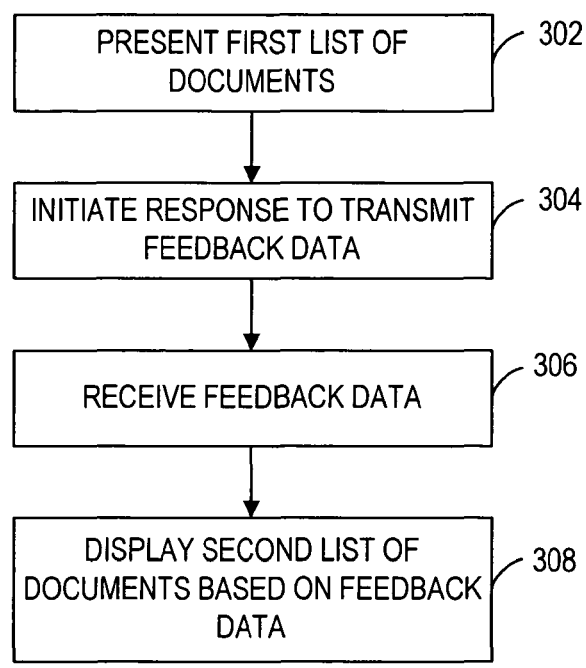
FIG. 3 illustrates an embodiment of a method for providing feedback for one or more documents.

FIG. 3 illustrates an embodiment of a method for providing feedback for one or more documents. In step 302, the user can be presented with a first list of documents of search results that correspond to search query that the user originally submitted. In step 304, the user can initiate a response to transmit feedback data that is associated with one or more documents within the search results. As mentioned previously, the user may be presented with a UI for inputting feedback data for one or more documents. The user can input the data in a structured or unstructured format as detailed above. There may be many different methods for initiating a response to transmit feedback data. In an embodiment, the user can click on an image, icon, or link that is a representation of the document in order to trigger the UI to be presented to the user to input feedback data. In another embodiment, the user can hover their mouse cursor over the image, icon, or link that can trigger a UI to be presented to the user to input feedback data. In yet another embodiment, upon detection of an event that the will trigger displaying the UI, the UI can be displayed in a side pane that can be to the positioned to the side of the window that contains the documents of search results.

In an embodiment, the search engine can receive the feedback data in step 306. In another embodiment, a client-side application can be provided to receive the feedback data in step 306. In both embodiments, the search engine and the client-side application can instantly create an item of data based on the feedback data that was received. An item of data can be a second list of search results that includes one or more different documents or a reordered version of the first list of documents. Additionally, an item of data can be a notification that can acknowledge that the search engine or client-side application received the feedback data. When the item of data is a second list of search results, the client-side application or search engine can instantly display the second list when it receives the feedback data from the user at step 308. The client-side application can include a script language that can provide a conventional means to allow the user to reorder or re-rank the documents included in the first list of search results. For example, the user could click and drag icons, images, or links that represent documents above or below other icons, images, or links of other documents to create a reordered list of documents that correlate to an ascending or descending order of relevance. Once the user reorders or re-ranks the documents, the client-side application can instantly display the second list of search results. Alternatively, the search engine can be used to instantly display a second list of search results. The search engine can receive the feedback data, complete steps 204-208 as discussed in FIG. 2, and can display a second list of search results in view of the feedback data that was received.

In an embodiment, a client-side application can allow a user to store preferences on the client that can be used along with feedback data to allow the search engine to provide search results that correspond to the user's preferences and feedback data. For example, the user can customize his/her machine to inform a search engine that he/she prefers to have news content, sports content, video content, or image content ranked higher than any other type of content. Additionally, the client side application can inform the search engine of particular physical properties of the user's machine that can be used along with feedback data to provide relevant search results. For example, the client-side application can inform the search engine that the user's machine is a mobile device. The search engine may have certain documents indexed that are better formatted for mobile devices that the search engine can send to the user as search results in view of the user's feedback data.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for providing a user interface for managing feedback data used to rank search results, comprising:
   a storage that is configured to store aggregated feedback data;
   the user interface configured to:
      receive user-provided search queries;
      provide a list of search results; and
      receive user feedback; and
   one or more computing devices configured to:
      aggregate feedback data, including feedback generated by a user reordering documents presented in the user interface in response to a search query, wherein the documents are reordered in real time by the user in the user interface based on input which indicates that the user dragged a representation of an individual document within the list of search results above or below a representation of a different individual document within the list of search results;
associate the feedback data with documents;
rank the documents based on the feedback data; and
provide a second list of search results based at least in part on the rank of the documents.

2. The system according to claim 1, further comprising associating the search query with the feedback data and the documents.

3. The system according to claim 1, wherein the feedback data include textual comments describing a particular document.

4. The system according to claim 1, further comprising receiving the search request.

5. The system according to claim 4, further comprising emphasizing at least a portion of the feedback data based on how often the documents are indexed, wherein the at least a portion of the feedback data is emphasized more when the feedback data corresponds to a document that is indexed more frequently than other documents.

6. The system according to claim 1, wherein the feedback data are stored in an inverted index.

7. The system according to claim 1, wherein at least part of the feedback data is provided by a computing device based on preferences submitted by a user of the computing device.

8. The system according to claim 1, wherein the documents are ranked based at least in part on the feedback data and a physical characteristic of a requesting device.

9. The system of claim 1, wherein feedback data that is received at a time more recent to when a search request is received is emphasized more than older feedback data when ranking the documents, based on a staleness rate for the feedback, wherein weight given the feedback data decreases over time.

10. One or more hardware storage device having embodied thereon computer-usable instructions that, when executed by a computing device, perform a method of providing a user interface for managing feedback data used to rank search results, comprising:
generating the user interface configured to receive search queries, provide one or more search results, and receive user feedback regarding the one or more search results;
responsive to a user-provided search query received via the user interface, providing a list of search results;
aggregating feedback data that includes feedback generated by a user reordering documents within the list of search results presented in the user interface in response to a search query, wherein the documents are reordered within the list of search results in real time based on input which indicates that the user dragged a representation of an individual document within the list of search results above or below a representation of a different individual document within the list of search results;
associating the feedback data with documents;
ranking the documents based on the feedback data; and
providing a second list of search results based at least in part on the ranking.

11. The one or more hardware storage device according to claim 10, further comprising associating the search query with the feedback data and the documents.

12. The one or more hardware storage device according to claim 10, further comprising emphasizing the feedback data based on how often the documents are indexed, wherein the feedback data is emphasized more when the feedback data corresponds to a document that is indexed more frequently than other documents.

13. The one or more hardware storage device according to claim 10, wherein the documents are ranked based at least in part on the feedback data and a physical characteristic of a requesting device.

14. The one or more hardware storage device of claim 10, wherein feedback data that is received at a time more recent to when a search request is received is emphasized more than older feedback data when ranking the documents, based on a staleness rate for the feedback data, wherein weight given the feedback data decreases over time.

15. A method of providing a user interface for managing feedback data used to rank search results, comprising:
generating the user interface that includes:
the search results comprising a list of documents, and
a text box that receives textual comments from a user in response to the search results, wherein the user interface associates the textual comments with a particular document within the search results;
receiving, at a computing device, one or more elements of feedback data, wherein the one or more elements of feedback data include the textual comments associated with the particular document;
associating the one or more elements of feedback data with one or more documents;
ranking the one or more documents based on the one or more elements of feedback data, wherein, when ranking the one or more documents, the feedback data is emphasized based on how often the one or more documents is indexed, the feedback data being emphasized more when the feedback data corresponds to a document that is indexed more frequently than other documents; and
providing the ranked one or more documents.

16. The method of claim 15, further comprising receiving at least a portion of the one or more elements of feedback data in an email.

17. The method of claim 15, further comprising;
storing words from the textual comments and keywords describing the particular document in an index;
ranking the particular document at least in part based on the keywords and the textual comments, wherein the words from the textual comments are given more weight than the keywords when determining the ranking.

18. The method of claim 15, wherein at least a portion of the feedback data is received verbally and converted into text.

19. The method of claim 15, wherein the documents are ranked based at least in part on the feedback data and a physical characteristic of a requesting device.

20. The method of claim 15, wherein feedback data that is received at a time more recent to when a search request is receivedis emphasized more than older feedback data when ranking the one or more documents, based on a staleness rate for the feedback data, wherein weight given the feedback data decreases over time.

* * * * *